United States Patent [19]
Kimura et al.

[11] Patent Number: 4,469,422
[45] Date of Patent: Sep. 4, 1984

[54] ELECTRIC CONNECTOR FOR CAMERA

[75] Inventors: Makoto Kimura; Naoki Tomino, both of Tokyo; Kenichi Magariyama, Yokohama; Yoshiharu Shiokama, Kawasaki, all of Japan

[73] Assignee: Nippon Kogaku K.K., Tokyo, Japan

[21] Appl. No.: 424,256

[22] Filed: Sep. 27, 1982.

[30] Foreign Application Priority Data

Oct. 19, 1981 [JP] Japan ................................. 56-166561

[51] Int. Cl.³ ............................................. G03B 17/14
[52] U.S. Cl. .................................... 354/286; 354/219
[58] Field of Search ..................... 354/46, 53, 56, 152, 354/202, 195, 197, 219, 286, 288, 289

[56] References Cited

U.S. PATENT DOCUMENTS 3,967,299 6/1976 Shono ................................. 354/219
4,196,997 4/1980 Ohmori et al. ...................... 354/286
4,357,089 11/1982 Okura et al. ......................... 354/286

FOREIGN PATENT DOCUMENTS 590694 1/1934 Fed. Rep. of Germany ...... 354/219
27635 3/1977 Japan ................................. 354/219

Primary Examiner—John Gonzales
Attorney, Agent, or Firm—Fitzpatrick, Cella, Harper & Scinto

[57] ABSTRACT

An electric connector for camera is adapted to form an electric connection between an electric device within a taking lens barrel and an electric device within a finder system of the camera. The connector is disposed between the mount for mounting the lens barrel and the holder for mounting the finder system. The connector comprises first and second contacts. The first contact is connectable to the electric device in the lens barrel when the latter is mounted. The second contact is in electric connection with the first contact and connectable to the electric device in the finder system when the latter is mounted.

3 Claims, 5 Drawing Figures

ELECTRIC CONNECTOR FOR CAMERA

BACKGROUND OF THE INVENTION

1. Field of the Invention

The present invention relates to an electric connector for a camera, in particular, for such type of single-lens reflex camera in which both the taking lens barrel and the finder system are exchangeably mounted on the camera.

2. Description of the Prior Art

With the rapid advancement in electronics and especially with the development of miniaturized electric elements in these years, a remarkable and rapid advancement in automation has been made also in cameras. For example, camera-mounted exposure meters, automatic aperture control, electronic shutter and automatic focusing systems have been realized. With the automation of the camera, however, the electric circuit used therefor has become more complicated. Therefore, at present, it is one of the most important problems to arrange various complicated circuits in a camera. This is particularly true for such type of single-lens reflex camera which has an exchangeable lens barrel and an exchangeable finder system. In case of this type of camera, the design and system of the camera are primarily determined by the arrangement of those circuits. Under the circumstances, various electric connectors adapted to connect the electric device within the lens barrel and the electric device within the body of camera have been proposed and some of them are now in use. However, as to the connection between the electric device in an exchangeable finder system and the electric device in a lens barrel there has not yet been disclosed any useful electric connection means.

In the art, such auto-focusing single-lens reflex camera also has been known in which the motor for driving the lens arranged within a lens barrel is controlled by an automatic focus detector provided within the finder system. In case of this known camera, the electric terminal of the lens barrel and the electric terminal of the finder system are electrically connected by a cable which does not pass through the interior of the camera but externally from one terminal to another terminal. Obviously, the use of such external connection cable causes some problems. The cable interferes the user's operation of the camera. The user often forgets to connect the terminals by the cable. Since the terminals are exposed to the air, they are easily affected and damaged by dust and moisture.

The above-mentioned known electric connector proposed to make a connection between the lens barrel and the main body of camera is not directly applicable to the electrical connection between the electric device in a finder system and the electric device in a lens barrel on a camera. To attain it, a separate connector is required on the mount for the finder system. Furthermore, it is required to lay a code within the camera's main body from one connector to the other connector. This is practically impossible because the space in the main body available for such code is very small. Even if it is possible, the reliability of the camera may be greatly reduced by it in view of the mounting. In addition, a substantial increased in cost will be caused by it.

SUMMARY OF THE INVENTION

Accordingly, the object of the present invention is to solve the above problems and provide an electric connector for cameras which is simple in electrical equipment and high in reliability and which is never exposed to the exterior.

To attain the object according to the invention it is proposed to provide a connector on the inner wall of the camera body between the lens mount and the finder support part of the camera body. The connector has, on its one surface, a first electric contact connectable to the electric device within the lens barrel. On another surface, the connector has a second electric contact disposed in communication with the first contact and connectable to the electric device within the finder system. Through this one connector, the electric devices in the lens barrel and in the finder are electrically connected to each other.

Other and further objects, features and advantages will appear more fully from the following description taken in connection with the accompanying drawings.

DESCRIPTION OF PREFERRED EMBODIMENTS

Figure 1:
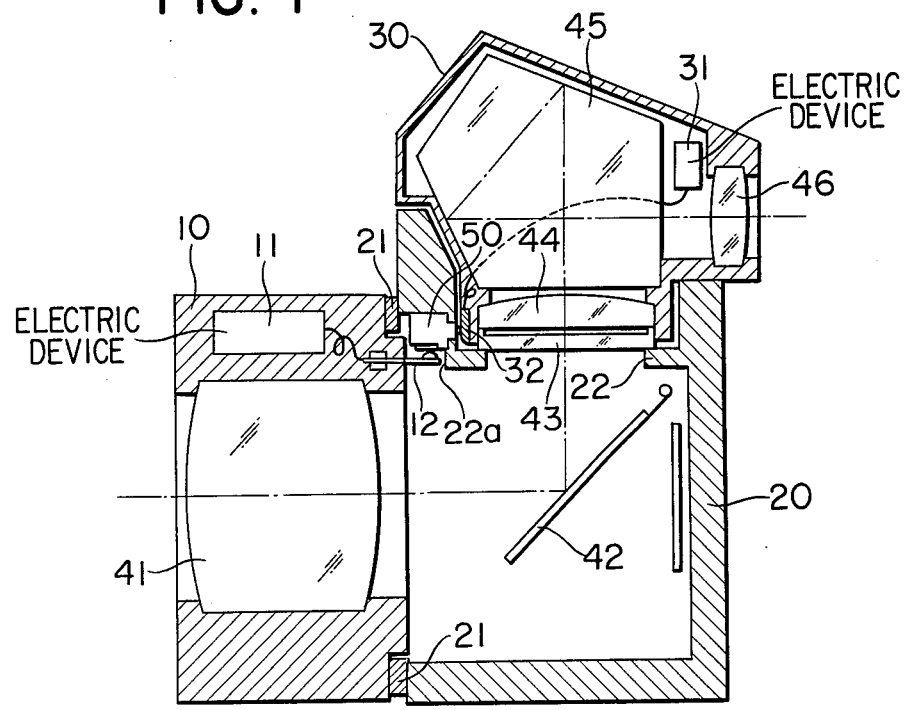
FIG. 1 is a sectional view illustrating the arrangement of an electric connector according to an embodiment of the invention.
Figure 2:
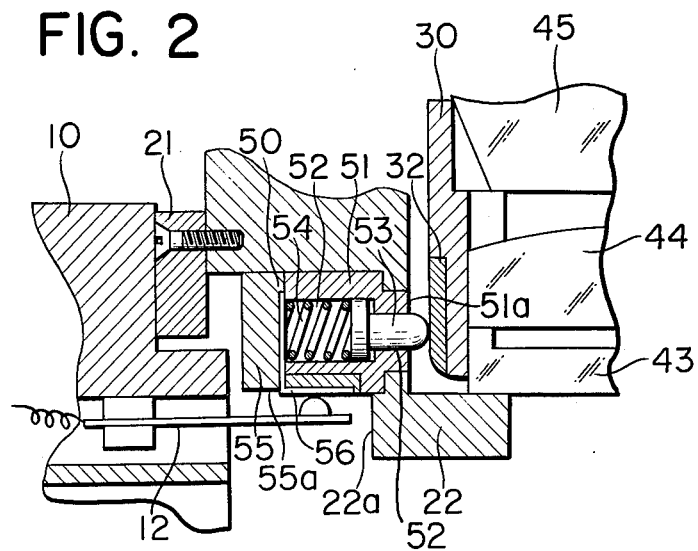
FIG. 2 is an enlarged sectional view of the connector shown in FIG. 1.

Referring to FIGS. 1 and 2 showing an embodiment of the invention, 10 is a lens barrel and 20 is the body of a camera. The lens barrel 10 is mounted on the camera body 20 through a lens mount 21 provided with a bayonet. 30 is a finder system which is mounted on a holder part 22 of the camera body 20 and locked in position by locking means, not shown.

41 is a taking lens. The light coming from an object passes through the taking lens 41 and then it is reflected by a pivotable mirror 42 to form a light image of the object on a focus screen 43. The object image formed on the focus screen 44 is observable through a condenser lens 44, penta prism 45 and eye-piece 46.

A connector 50, as later described in detail, is fixedly mounted on the inner wall 22a of the camera body between the holder part 22 and the lens mount 21. The connector 50 is connected to an electric device 11 through a contact 12 on the lens side and also to an electric device 31 through a contact 32 on the finder side. The electric device 11 includes, for example, a lens driving circuit containing a motor for driving the taking lens 41 along the optical axis. The electric device 11 is provided within the lens barrel 10. On the other hand, the electric device 31 provided within the finder system 30 includes, for example, a focus detection and control circuit.

As shown in FIG. 2, the connector 50 comprises a main body 51, a cover member 55 and first and second contacts 56 and 53. The main connector body 51 is formed of a dielectric material and has a central through-hole 52 formed therein. In the through-hole 52, the second contact 53 is slidably disposed under the biasing force of a compression spring 54. The compression spring 54 biases the second contact 53 toward the contact 32 on the finder system 30 beyond one end surface of the connector body. Thus, the second contact 53 is maintained always in electrical contact with the contact 32 on the side of the finder system 30 by the compression spring 54. The cover 55 is also formed of dielectrical material and covers the through-hole 52 at the opposite end to the second contact 53. On one surface 55a of the cover member 55 there is fixed the first contact 56 which is L-shaped and which is disposed in such manner that the vertical leg of the L is within the cover 55 and in contact with the compression spring 54 and the horizontal leg of the L is outside of the cover and in contact with the contact 12 of the lens barrel 10.

Figure 3:
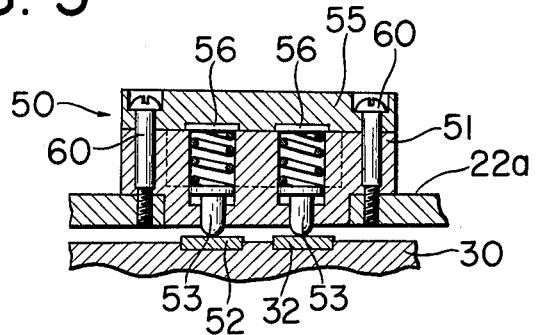
FIG. 3 is another sectional view of the connector taken along a line perpendicular to the plane of the drawing.

The connector body 51, cover member 55, first and second contacts 56 and 53 are assembled together to form a rectangular connector 50 as a unit. As shown in FIG. 3, the connector unit 50 is fixed to the front wall 22a of the holding portion of the camera body by means of screw 60. Although two pairs of first and second contacts 56 and 53 are shown in FIG. 3, one connector unit 50 may have only one pair of such contacts. Also, if necessary, three or more pairs of such contacts may be provided in one connector unit 50.

The manner of operation of the first embodiment shown in FIGS. 1 to 3 is as follows:

When the lens barrel 10 and the finder system 30 are mounted on the camera body 20, the first contact 56 on one surface 51a of the rectangular connector 50 is contacted by the contact 12 provided on the lens barrel thereby forming an electrically conductive connection between the two contacts 56 and 12. Similarly, the second contact 53 on another surface 51a of the connector 50 is contacted by the contact 32 on the finder system 30. Since, as previously noted, the first contact 56 and the second contact 53 of the connector 50 are electrically connected with each other through the compression spring 54, there is obtained an electric connection between the contact 12 on the lens barrel and the contact 32 on the finder system through the rectangular connector 50. In this manner, the electric device 11 within the lens barrel and the electric device 31 within the finder system can be directly connected with each other electrically without being exposed to the exterior of the camera body.

Figure 4:
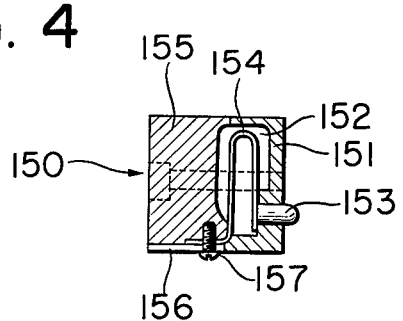
FIG. 4 is an enlarged sectional view showing another embodiment of the invention.

FIG. 4 shows a second embodiment of the invention.

Generally designated by 150 is a connector according to the second embodiment of the invention. The connector includes a main connector body 151 and a cover member 155. An inner space 152 is formed by the connector body 151 and the cover member 155. In the space 152 there is disposed a leaf spring 154 of high electric conductivity. A first contact 156 is fixed to one end of the leaf spring 154 by means of a small screw 157. At the free end, the spring has a second contact 154. In this embodiment, therefore, the leaf spring 154 performs the same function as the coil spring 54 in the first embodiment does. According to the invention, even with such leaf spring 154, there is obtained a sufficient contact pressure to form good electrical contact between the second contact 153 of the connector and the contact 32 of the finder system.

Figure 5:
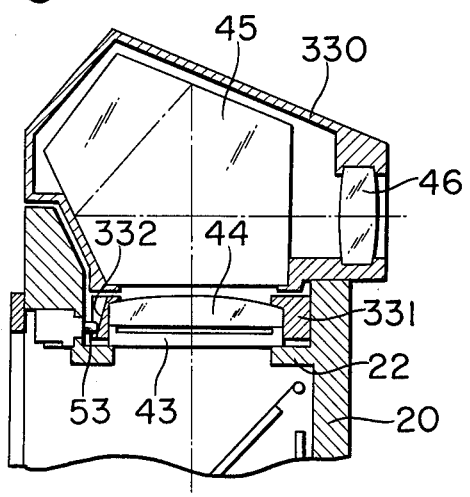
FIG. 5 is a sectional view illustrating another application form of the connector according to the invention.

FIG. 5 shows another application form of the connector 50.

The penta prism 45 and the eyepiece 46 are contained in a finder cover 330. The focus screen 43 and the condenser lens 44 are contained in a screen frame 331 formed as a separate member from the finder cover 330. The finder cover 330 and the screen frame 331 are mounted on the holder part 22 of the camera body. In this case, it is advisable that the screen frame 331 should have a sloped portion 332 provided at least in the area where the second contact 53 of the connector 50 is to be pressure-contacted by the screen frame 331. With this arrangement, the second contact 53 serves as fixing means for the screen frame 331. In this case, it is not always necessary to use the second contact 53 as an electric contact.

As readily understood from the foregoing, the connector according to the invention is adaptable for various combinations of various exchangeable lens barrels and various exchangeable finder systems. Since no signal processing is carried out within the camera's main body in which the connector is built in, the use of the electric connector enables a single camera to be used for many different purposes. A particular combination of lens tube and finder system may be formed as a unit. By preparing various kinds of such unit, for example, autofocusing unit, remote control unit etc., the camera can be used for specific purposes when these different units are exchangeably mounted on the main body of the camera as described above.

While the invention has been particularly shown and described with reference to preferred embodiments thereof, it is to be understood that the invention is not limited thereto but many modifications and variations of the invention are possible within the scope of the appended claims.

We claim:

1. In a camera having a housing and a mount disposed on a front portion of the housing for receiving a lens barrel and a holder disposed on an upper portion of the housing for supporting a finder system, both the lens barrel and the finder system being exchangeable and each having a built-in electric device, the improvement comprising:

means for electrically connecting the electric device in said lens barrel and the electric device in said finder system;

said electric connection means being disposed between said mount and said holder and having first and second contacts;

said first contact being connectable to the electric device in said lens barrel when the latter is mounted on said mount;

said second contact being in connection with said first contact and connectable to the electric device in said finder system when the latter is mounted on said holder; and said electric connection means further including a frame member which is arranged to pass through said camera housing from said front portion to said upper portion, said first contact being exposed from one surface of said frame member, said second contact being exposed from another surface of said frame member, and means for electrically connecting directly said first contact and said second contact.

2. A camera as set forth in claim 1, wherein said frame member holds said second contact movably in the direction substantially normal to said another surface and wherein said electric connection means includes means for biasing said second contact in the direction projecting beyond said another surface.

3. A camera as set forth in claim 2, wherein said biasing means includes an elastic member of high electric conductivity disposed between said first and second contacts.

* * * * *